United States Patent [19]

Coccoli

[11] 4,281,896

[45] Aug. 4, 1981

[54] SHARED APERTURE SEPARATOR FOR RECIPROCAL PATH OPTICAL BEAMS

[75] Inventor: Joseph D. Coccoli, Sudbury, Mass.

[73] Assignee: The Charles Stark Draper Laboratory, Inc., Cambridge, Mass.

[21] Appl. No.: 930,140

[22] Filed: Aug. 2, 1978

[30] Foreign Application Priority Data

Jun. 22, 1979 [JP] Japan .................. 54-78945

[51] Int. Cl.³ ............................................ G02B 27/14
[52] U.S. Cl. .................................. 350/171; 350/487
[58] Field of Search ............... 350/171, 172, 360, 285, 350/486, 487

[56] References Cited

U.S. PATENT DOCUMENTS

| 1,482,070 | 1/1924 | Douglass ............... 350/172 |
| 1,509,936 | 9/1924 | Douglass ............... 350/172 |
| 3,668,406 | 6/1972 | Reid et al. ............. 350/172 |
| 3,877,802 | 4/1975 | Greenspan ............. 350/299 |
| 4,146,307 | 3/1979 | Gaffard ................. 350/360 |

FOREIGN PATENT DOCUMENTS 1489926  4/1969  Fed. Rep. of Germany .......... 350/360

*Primary Examiner*—R. A. Rosenberger
*Attorney, Agent, or Firm*—Kenway & Jenney

[57] ABSTRACT

Apparatus for reflecting an incident laser beam to direct the beam outgoing along a path toward a target, including a stepped array of reflector elements. The array elements have reflective surfaces arranged so that the surfaces are overlapping as seen by the incident beam. In addition, the elements are spaced apart in a direction perpendicular to the path so that light returning from the target passes between the elements.

13 Claims, 2 Drawing Figures

SHARED APERTURE SEPARATOR FOR RECIPROCAL PATH OPTICAL BEAMS

BACKGROUND OF THE INVENTION

This invention relates to high energy lasers and more particularly to techniques and apparatus for separating reciprocal path optical signals.

When focusing very high energy laser beams on distant targets, it is often necessary to measure distortions in the optical signal returning from the target on the same, or nearly the same, optical path as the outgoing high energy beam in order to measure disturbances in the beam path. The resultant beam path information may be used to control adaptive optic surfaces for the purposes of improving the focal pattern of the target which is otherwise degraded by the propagation path disturbances.

In a shared aperture laser beam separator, the outgoing laser beam and return signal from the target share the same aperture, assuring that the beam and signal have travelled over the same path. An ideal shared aperture separator for reciprocal path beams will direct substantially all of an input laser beam toward the target, i.e. without any internal dissipation or energy dump, and will accept and decouple radiant power of the same wavelength that has been reflected from the target back along exactly reciprocal atmospheric paths.

No real aperture element, of course, can decouple light signals that simultaneously share exactly reciprocal paths if there is no distinction of wavelength and polarization. Attempts to arrange for differences in polarity or wavelength of the outgoing beam and returning signal have required the use of materials on which, or through which, the high energy laser beam is transmitted, at a sacrifice of energy or with a deteriorating effect on the material.

Pulsing the high energy laser beam can allow the return signal to return between pulses for detection and analysis without interference. No satisfactory device for such synchronously timed apertures has yet been created.

Exact beam reciprocity may be given up. For example, return waves may be sampled through a distribution of small holes in a high energy beam relay mirror. However, each hole extracts and dumps some energy, so the total area of all the holes must be kept small compared to the area of the reflecting surface. The edges of the holes facing the detector can scatter significant amounts of outgoing laser beam energy into detector channels.

Accordingly, it is an object of this invention to provide for obtaining beam path information while avoiding the above-described problems.

It is another object to so provide, with apparatus and techniques that are simple and use readily available materials.

Other objects and features will be in part apparent and in part pointed out hereinafter.

SUMMARY OF THE INVENTION

The invention is a shared aperture separator for reciprocal path optical signals. The separator splits an input coherent optical beam, or laser signal, into a plurality of substantially parallel laminar beams which are directed through a shared aperture along transmit paths in a predetermined direction toward a target. The separator also receives a signal which may be reflected from the target through the shared aperture. The received signal is split into a plurality of substantially parallel laminar beams along paths parallel to and interleaved with the transmit paths.

With this configuration, the optical signal available for detection returns from a target on very nearly the same optical path as the outgoing laminar beams directed to the target. In the laminar beam portion of the return signal, distortions may readily be measured using conventional techniques to provide estimates of the disturbances in the beam path. Subsequently, the beam path information may be used to control the reflector elements orientation (specifically, the phase displacement and phase tilt) in order to improve the focal pattern on the target.

DESCRIPTION OF THE PREFERRED EMBODIMENT

Figure 1:
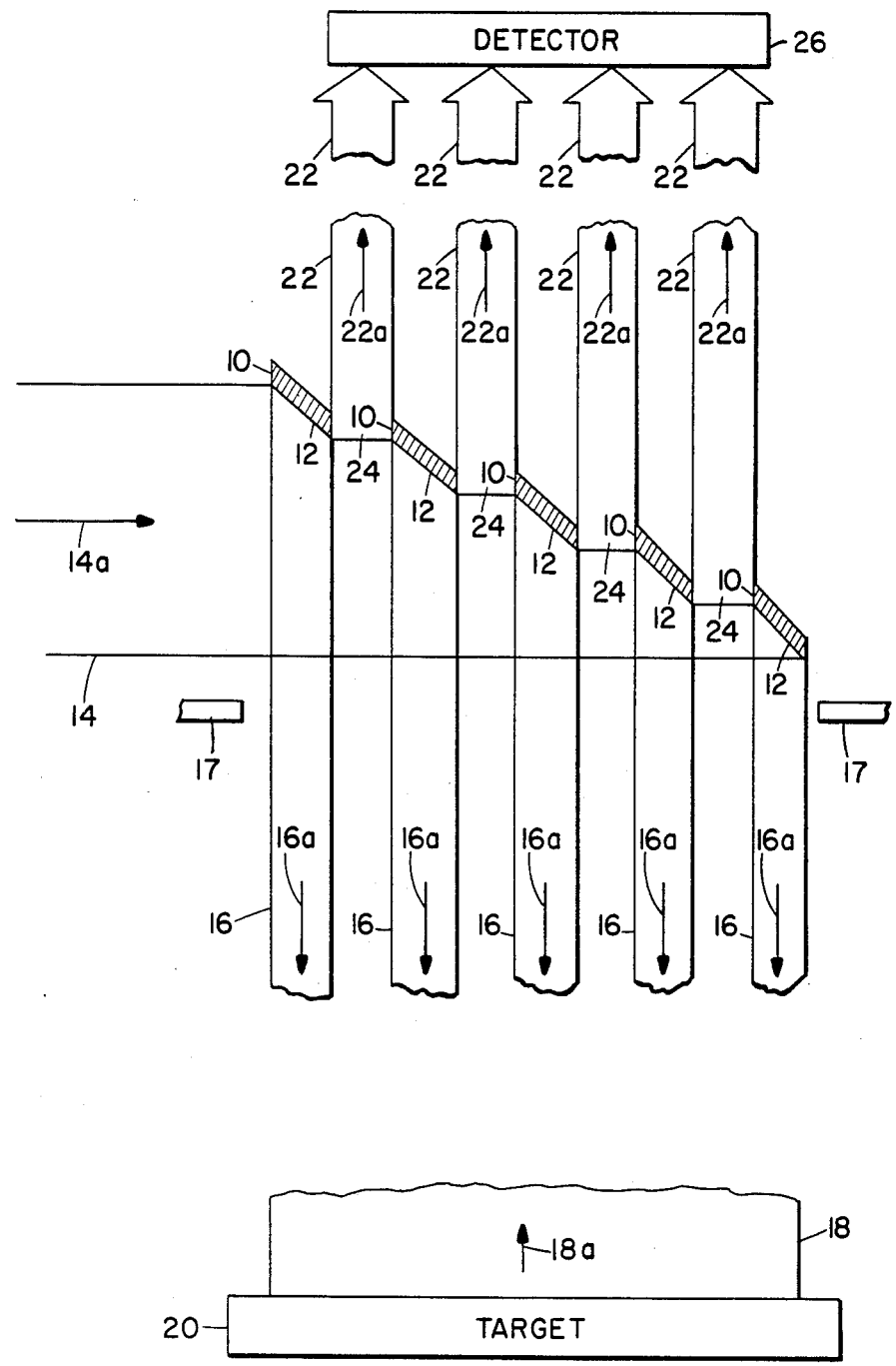
FIG. 1 is a schematic representation of a preferred embodiment of the invention.

Referring to FIG. 1, there is shown a shared aperture beam separator having a stepped array of reflector elements 10 (in cross-section) bearing planar, reflective surfaces 12 of highly polished metal. The surfaces 12 include at least one pair of parallel straight edges. The elements 10 are arranged within a support structure (not shown) so that the parallel edges of their reflecting surfaces 12 are mutually parallel. The elements 10 are maintained in stepped fashion, so that an input laser beam 14 (in direction 14a) is wholly reflected and separated into parallel outgoing laminar beams 16 which pass through shared aperture 17 (in direction 16a). As shown, elements 10 are arranged with adjacent parallel edges of adjacent reflecting surfaces overlapping when viewed in the propagation direction of beam 14. As viewed by incident beam 14, the reflector surfaces 12 overlap and provide a complete reflective surface. In the present embodiment, the angle of the surfaces 12 to the propagation direction of beam 14 is about 45°, so that the beam 14 and the outgoing beams 16 are approximately at right angles. In other embodiments, this angle may differ from 90° provided that a normal to the reflecting surface 12 of an element 10 is parallel to the bisector of the angle between the propagation directions of beam 14 and the beams 16.

In addition, the reflector elements 10 are spaced apart in a direction generally perpendicular to the path followed by beams 16, so that there is a gap between the adjacent parallel edges of adjacent elements when viewed in the direction opposite to the propagation direction of beams 16. With this configuration, portions of the light signal 18 that is scattered or reflected from a target 20 back along the general path (but in the opposite direction, i.e. in direction 18a) of the outgoing beams 16 will pass through the shared aperture 17 and through spaces 24 between reflector elements 10 to establish return laminar beams 22 (in direction 22a) which pass to a detector 26. The paths of the light of laminar beams 22 are interleaved with the paths of the light of laminar beams 16.

In operation, then, an incident high energy laser beam 14 is reflected off the array of reflector surfaces 12 and separated into laminar outgoing beams 16. Portions of the light returning from the target 20 propagates along the general path of the laminar outgoing beams 16, and through the spaces 24 of the reflector array to a detector 26.

The beam separator sacrifices exact path reciprocity for approximate reciprocity to achieve a basis for beam decoupling. However, there is no loss of energy at the shared apertures of the apparatus. Furthermore, there are no high energy laser irradiated scattering edges facing the detector. The effective area of the aperture for the return wave can be large and comparable to the aperture for the outgoing laser beam without dumping any of the outgoing laser beam energy.

In the preferred embodiment, the laser beam is incident on polished metal reflectors, yielding reliability, performance, and reflectivity, so that dissipative losses are minimal. With this configuration, the beam separator is wavelength and polarization indifferent.

The return wave paths, while not exactly reciprocal, are well intermixed with the outgoing beam paths to achieve a useful sampling scale compared with the scale of the expected optical path disturbances.

Figure 2:
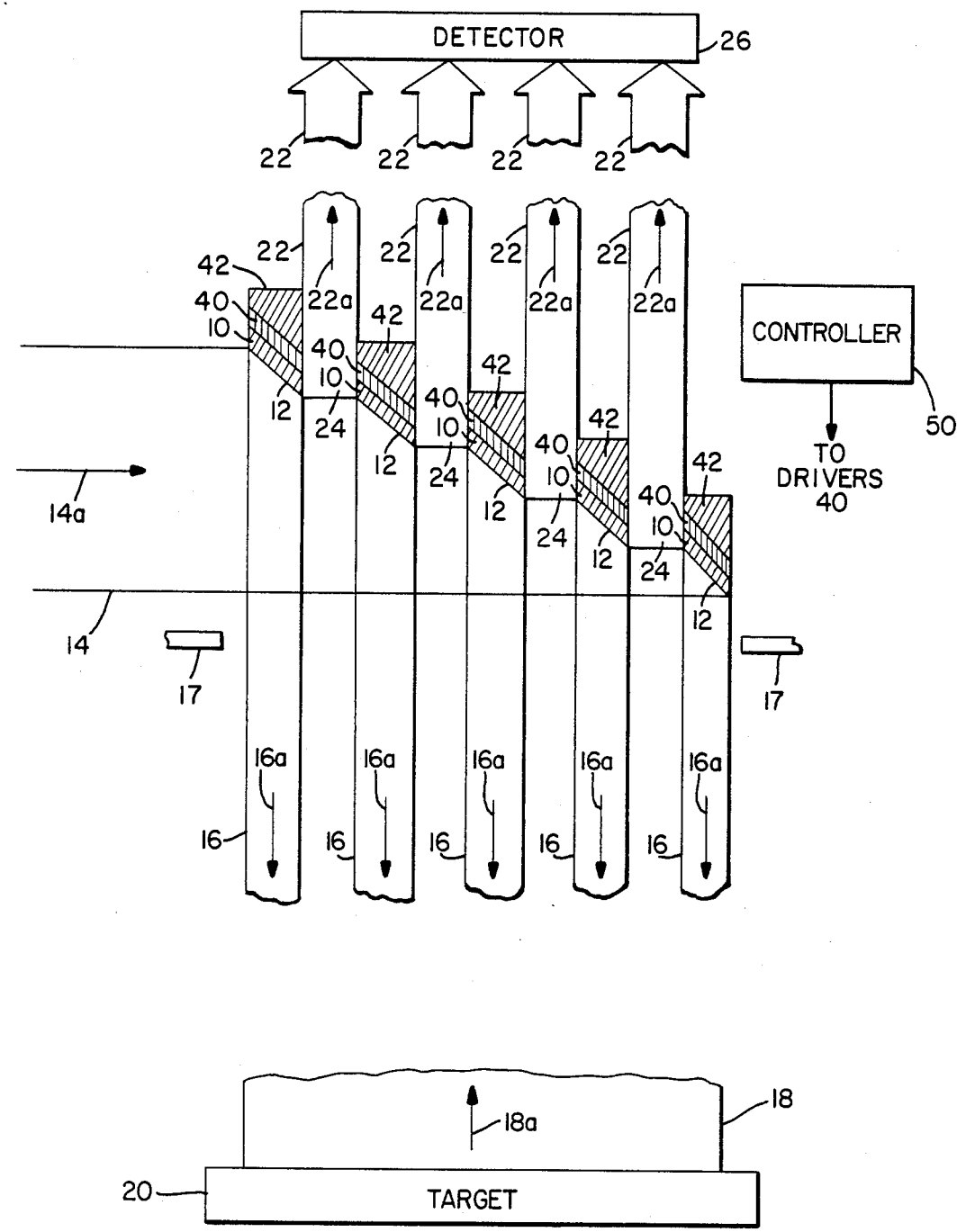
FIG. 2 is a schematic representation of an alternative embodiment of the invention.

FIG. 2 shows an alternative embodiment where elements corresponding to elements in the FIG. 1 embodiment are identified with identical reference designations. In FIG. 2, the reflectors 10 are mounted on piezoelectric drivers 40 positioned on base members 42. The drivers 40 may be controlled to independently translate the reflectors 10 in the direction of the output beams 16, and to rotate about an axis perpendicular to both the direction of the input beam 14 and the transmitted beams 16. In this configuration, the translation of the reflector elements provides individualized phase displacement adjustment in the transmitted beams 16. Similarly, the rotation of the reflector elements provide individualized phase tilt adjustment for the transmitted beams 16. In alternative embodiments, the drivers 40 may be controlled to independently translate the reflectors 10 in the direction of the input beam to achieve individualized phase displacement adjustment in beams 16. In addition, the drivers 40 may be adapted to angularly rotate the reflectors 10 about a first axis perpendicular to both the directions of beams 14 and 16 as well as about a second axis perpendicular to this first axis and parallel to the reflecting surface of a reflector 10. This form of the invention provides two-axis individualized phase tilt adjustment.

Thus, with a suitable control coupled to detector 26, illustrated by block 50 in FIG. 2, each of the reflectors may be a deformable mirror that may be flexibly driven for a full two dimensional zonal or modal surface control, so that the beam separator can serve as both the shared aperture and adaptive optical surface.

As various changes could be made in the above constructions without departing from the scope of the invention, it should be understood that all matter contained in the above description or shown in the accompanying drawings shall be interpreted as illustrative and not in a limiting sense.

What is claimed is:

1. A method for monitoring conditions along the propagation path of reciprocal path optical signals, comprising the steps of:

directing an incident laser beam toward a target by way of a stepped array of parallel reflecting surfaces arranged on spaced apart elements, in which said reflecting surfaces overlap as seen by the incident beam and the elements are spaced apart in a direction perpendicular to said path, whereby said incident laser beam is split into a plurality of coherent laminar beams propagating toward said target, and said laminar beams have controlled relative phase displacements, and detecting an optical signal returning on said path from said target which passes between said spaced apart elements.

2. Shared aperture reciprocal path optical signal separating apparatus comprising:

transmit means for splitting an input coherent optical beam into a plurality of substantially parallel laminar beams directed through a shared aperture along transmit paths in a predetermined direction, and wherein the coherence of said input optical beam is maintained in said laminar beams, and said laminar beams have controlled relative phase displacements, receiving means for receiving a received signal through said shared aperture and splitting said received signal into a plurality of substantially parallel laminar beams along received paths parallel to and interleaved with said transmit paths.

3. Apparatus according to claim 2 wherein said transmit and receiving means comprise a stepped array of reflector elements, wherein each element has a substantially planar light reflecting surface having at least one pair of parallel straight edges, and wherein each element is oriented so that a normal to said reflecting surface is parallel to the bisector of the angle between the propagation direction of said input beam and said predetermined direction, and wherein said reflector elements are further oriented so that:

A. the parallel edges of said reflecting surfaces are mutually parallel, and

B. there is overlap of the adjacent parallel edges of adjacent elements in said array in the propagation direction of said input beam, and C. there is a gap between the adjacent parallel edges of adjacent elements in said array in said predetermined direction.

4. Apparatus according to claim 3 further comprising translational positioning means to adjust the position of at least one of said reflector elements in the direction of said predetermined direction.

5. Apparatus according to claim 4 further comprising rotational positioning means to adjust the angular orientation of at least one of said reflector elements about a first axis perpendicular to both said predetermined direction and said input beam propagation direction.

6. Apparatus according to claim 5 wherein said rotational positioning means further comprises means to adjust the angular orientation of at least one of said reflecting elements about a second axis, said second axis being perpendicular to said first axis and parallel to the reflecting surface of said reflecting element.

7. Apparatus according to claim 3 further comprising rotational positioning means to adjust the angular orientation of at least one of said reflector elements about a first axis perpendicular to both said predetermined direction and said input beam propagation direction.

8. Apparatus according to claim 7 wherein said rotational positioning means further comprises means to adjust the angular orientation of at least one of said reflecting elements about a second axis, said second axis being perpendicular to said first axis and parallel to the reflecting surface of said reflecting element.

9. Apparatus according to claim 3 further comprising translational positioning means to adjust the position of at least one of said reflector elements in the direction of said input beam propagation direction.

10. Apparatus according to claim 9 further comprising rotational positioning means to adjust the angular orientation of at least one of said reflector elements about a first axis perpendicular to both said pedetermined direction and said input beam propagation direction.

11. Apparatus according to claim 10 wherein said rotational positioning means further comprises means to adjust the angular orientation of at least one of said reflecting elements about a second axis, said second axis being perpendicular to said first axis and parallel to the reflecting surface of said reflecting element.

12. Apparatus according to claims 4 or 9 further comprising an adaptive control means responsive to said receiving means to adaptively control said translational positioning means.

13. Apparatus according to claims 7, 10, 6, 8 or 11 further comprising an adaptive control means responsive to said receiving means to adaptively control said rotational positioning means.

* * * * *